US009710967B2

(12) United States Patent
Makino et al.

(10) Patent No.: US 9,710,967 B2
(45) Date of Patent: Jul. 18, 2017

(54) INFORMATION PROCESSING PROGRAM, INFORMATION PROCESSING SYSTEM, INFORMATION PROCESSING APPARATUS, AND INFORMATION PROCESSING METHOD, UTILIZING AUGMENTED REALITY TECHNIQUE

(75) Inventors: Kozo Makino, Kyoto (JP); Keisuke Kikuchi, Yokohama (JP); Yutaka Fukaya, Yokohama (JP); Yota Aizawa, Yokohama (JP)

(73) Assignee: NINTENDO CO., LTD., Kyoto (JP)

( * ) Notice: Subject to any disclaimer, the term of this patent is extended or adjusted under 35 U.S.C. 154(b) by 1276 days.

(21) Appl. No.: 13/366,866

(22) Filed: Feb. 6, 2012

(65) Prior Publication Data
US 2013/0050500 A1    Feb. 28, 2013

(30) Foreign Application Priority Data
Aug. 31, 2011 (JP) ................................. 2011-189099

(51) Int. Cl.
*H04N 5/225* (2006.01)
*G06T 19/00* (2011.01)
(Continued)

(52) U.S. Cl.
CPC ............ *G06T 19/006* (2013.01); *A63F 13/10* (2013.01); *A63F 13/211* (2014.09);
(Continued)

(58) Field of Classification Search
USPC ........................................................ 348/169
See application file for complete search history.

(56) References Cited

U.S. PATENT DOCUMENTS 6,937,255 B2    8/2005  Fukuda et al.
7,274,380 B2 *  9/2007  Navab et al. ................. 345/633
(Continued)

FOREIGN PATENT DOCUMENTS

JP    2002-247602    8/2002
JP    2003-281504    10/2003
(Continued)

OTHER PUBLICATIONS

Nov. 14, 2013 Office Action in U.S. Appl. No. 13/366,798, 31 pages.
(Continued)

*Primary Examiner* — Tracy Y Li
(74) *Attorney, Agent, or Firm* — Nixon & Vanderhye PC

(57) ABSTRACT

An exemplary embodiment provides an information processing program. The information processing program includes image obtaining instructions, search target detection instructions, shape recognition instructions, event occurrence instructions, virtual image generation instructions, and display control instructions. The search target detection instructions cause a computer to detect a search target from an image of a subject obtained in accordance with the image obtaining instructions. The shape recognition instructions cause the computer to recognize a shape of the search target. The event occurrence instructions cause the computer to cause an event to occur in a virtual space in accordance with the shape of the search target. The virtual image generation instructions cause the computer to generate a virtual image by shooting the event that occurs in accordance with the event occurrence instructions with a virtual camera arranged in the virtual space.

12 Claims, 13 Drawing Sheets

(51) Int. Cl.
*A63F 13/213* (2014.01)
*A63F 13/655* (2014.01)
*A63F 13/211* (2014.01)
*H04N 13/04* (2006.01)
*A63F 13/40* (2014.01)

(52) U.S. Cl.
CPC .......... *A63F 13/213* (2014.09); *A63F 13/655* (2014.09); *H04N 13/0452* (2013.01); *A63F 2300/1093* (2013.01); *A63F 2300/6009* (2013.01); *A63F 2300/6661* (2013.01); *A63F 2300/69* (2013.01)

(56) References Cited

U.S. PATENT DOCUMENTS

| | | | |
|---|---|---|---|
| 7,911,503 B2 | 3/2011 | Kobayashi | |
| 7,925,117 B2* | 4/2011 | Hamza et al. | 382/294 |
| 8,212,813 B2 | 7/2012 | Furuhashi | |
| 8,253,105 B1 | 8/2012 | Warnke et al. | |
| 8,553,938 B2 | 10/2013 | Makino et al. | |
| 2002/0084974 A1 | 7/2002 | Ohshima et al. | |
| 2005/0168486 A1 | 8/2005 | Sato et al. | |
| 2007/0126734 A1* | 6/2007 | Sugio et al. | 345/419 |
| 2008/0292131 A1 | 11/2008 | Takemoto et al. | |
| 2009/0022665 A1* | 1/2009 | Isabelle et al. | 424/9.1 |
| 2010/0208051 A1 | 8/2010 | Tsurumi et al. | |
| 2011/0018875 A1* | 1/2011 | Arahari et al. | 345/420 |
| 2011/0304640 A1 | 12/2011 | Noge | |
| 2011/0304710 A1* | 12/2011 | Ito et al. | 348/51 |
| 2012/0044173 A1* | 2/2012 | Homma et al. | 345/173 |
| 2012/0050326 A1 | 3/2012 | Tanaka | |
| 2012/0075424 A1* | 3/2012 | Kawamoto et al. | 348/46 |
| 2012/0094773 A1* | 4/2012 | Suzuki | 463/43 |
| 2012/0219179 A1 | 8/2012 | Osako | |
| 2012/0235893 A1* | 9/2012 | Phillips et al. | 345/156 |

FOREIGN PATENT DOCUMENTS

| | | |
|---|---|---|
| JP | 2008-46687 | 2/2008 |
| JP | 2010-191487 | 9/2010 |
| JP | 2010-231459 | 10/2010 |
| JP | 2011-159300 | 8/2011 |
| JP | 4757948 | 8/2011 |
| WO | WO 2009/054619 | 4/2009 |

OTHER PUBLICATIONS

Jul. 18, 2013 Notice of Allowance in U.S. Appl. No. 13/366,833, 11 pages.

Kato et al., "An Augmented Reality System and its Calibration based Marker Tracking", *Transactions of the Virtual Reality Society of Japan,* 1999, vol. 4, No. 4 w/ English Abstract, 10 pages.

Kato et al. "Marker Tracking and HMD Calibration for a Video-based Augmented Reality Conferencing System" Augmented Reality, Proceedings 2nd IEEE and ACM International Workshop on Augmented Reality, pp. 1-10 (1999).

Office Action for U.S. Appl. No. 13/366,798, mailed May 28, 2014 (37 pages).

English-language Abstract and translation of JP2002-247602 (13 pages).

English-language Abstract and translation of JP2003-281504 (13 pages).

English-language Abstract of JP2008-046687 (1 page).

English-language Abstract of JP2010-191487 (1 page).

English-language Abstract and translation of JP2010-231459 (8 pages).

English-language Abstract of JP2011-159300 (1 page).

English-language Abstract of JP4757948 (1 page).

* cited by examiner (a)

(b)

INFORMATION PROCESSING PROGRAM, INFORMATION PROCESSING SYSTEM, INFORMATION PROCESSING APPARATUS, AND INFORMATION PROCESSING METHOD, UTILIZING AUGMENTED REALITY TECHNIQUE

This nonprovisional application is based on Japanese Patent Application No. 2011-189099 filed with the Japan Patent Office on Aug. 31, 2011, the entire contents of which are hereby incorporated by reference.

FIELD

The invention generally relates to an information processing program, an information processing system, an information processing apparatus, and an information processing method, utilizing an augmented reality technique.

BACKGROUND AND SUMMARY

An image pick-up apparatus such as a camera has conventionally employed a technique for detecting a prescribed image pick-up target from a picked-up image of a subject (picked-up image). For example, in an augmented reality technique, a technique for detecting a marker by subjecting a marker (a search target) included in an image picked up by a camera to image recognition processing (a marker detection technique) has been known.

An exemplary embodiment provides an information processing program, an information processing system, an information processing apparatus, and an information processing method, capable of providing more visual effects for having a user actually feel augmented reality by making use of a detected marker (a search target).

An exemplary embodiment provides a non-transitory storage medium encoded with a computer readable information processing program and executable by a computer of an information processing apparatus. The information processing apparatus is connected to an image pick-up apparatus and a display. The information processing program includes image obtaining instructions, search target detection instructions, shape recognition instructions, event occurrence instructions, virtual image generation instructions, and display control instructions. The image obtaining instructions cause the computer to obtain an image of a subject picked up by the image pick-up apparatus. The search target detection instructions cause the computer to detect a search target from the image of the subject obtained in accordance with the image obtaining instructions. The shape recognition instructions cause the computer to recognize a shape of the search target detected in accordance with the search target detection instructions. The event occurrence instructions cause the computer to cause an event to occur in a virtual space in accordance with the shape of the search target recognized in accordance with the shape recognition instructions. The virtual image generation instructions cause the computer to generate a virtual image by shooting the event that occurs in accordance with the event occurrence instructions with a virtual camera arranged in the virtual space. The display control instructions cause the display to display the virtual image such that it is visually recognized by a user as superimposed on the image of the subject or on the subject seen through a screen of the display.

According to the exemplary embodiment, since an event is caused to occur in the virtual space in accordance with the recognized shape of the search target, more visual effects for having the user actually feel augmented reality by utilizing the search target can be provided.

In an exemplary embodiment, the event occurrence instructions are adapted to cause the event to occur in accordance with the shape of the search target when a result of detection from a sensor detecting an orientation of the information processing apparatus indicates a prescribed orientation of the information processing apparatus.

According to the exemplary embodiment, since an event is prevented from occurring depending on a result of detection from the sensor detecting an orientation or motion of the information processing apparatus, an event can be prevented from occurring due to change in recognized shape of the search target caused by movement of the information processing apparatus by the user. Namely, the user can be caused to perform an operation as a developer intends to desirably cause an event to occur in accordance with a shape of the search target changed by movement of the search target.

In an exemplary embodiment, the shape recognition instructions are adapted to recognize the shape of the search target based on an orientation of a vector extending from a center of the search target toward one side of the search target in the image of the subject.

According to the exemplary embodiment, simply by calculating an orientation of the vector extending from the center of the search target to one side of the search target in the image of the subject, deformation of the shape of the search target can easily be recognized.

In an exemplary embodiment, the event occurrence instructions are adapted to cause a first event to occur when the search target is successfully detected in accordance with the search target detection instructions and to cause a second event to occur when the shape of the search target recognized in accordance with the shape recognition instructions deforms to a prescribed shape subsequent to occurrence of the first event.

According to the exemplary embodiment, since a first event is caused to occur when the search target is successfully detected and a second event is caused to occur when the shape of the search target deforms to a prescribed shape, more visual effects for having the user actually feel augmented reality by further utilizing the search target can be provided.

In an exemplary embodiment, the event that occurred in accordance with the event occurrence instructions includes arrangement of an object in a prescribed shape in the virtual space, and the virtual image generation instructions are adapted to generate the virtual image by shooting the object in the prescribed shape with the virtual camera.

According to the exemplary embodiment, since an object in a prescribed shape is displayed in accordance with an event, as compared with a case where an object is simply displayed at a position corresponding to the search target, more visual effects for having the user actually feel augmented reality can be provided.

In an exemplary embodiment, the event that occurred in accordance with the event occurrence instructions includes arrangement of a plate-shaped polygon in the virtual space, and the virtual image generation instructions are adapted to generate the virtual image by mapping a texture on the plate-shaped polygon and shooting the polygon with the virtual camera.

According to the exemplary embodiment, since a virtual image obtained by mapping a texture on the plate-shaped polygon arranged in the virtual space is generated, more visual effects for having the user actually feel augmented reality can be provided.

In an exemplary embodiment, the information processing program further includes position calculation instructions for calculating positional relation between the image pick-up apparatus and the search target based on the image of the subject and virtual camera arrangement instructions for arranging the virtual camera in accordance with the positional relation calculated in accordance with the position calculation instructions.

According to the exemplary embodiment, since an image picked up by a virtual camera arranged in accordance with positional relation between the image pick-up apparatus and the search target is generated as the virtual image, such display as if an event occurred in a real world can be provided and hence more visual effects for having the user actually feel augmented reality can be provided.

An exemplary embodiment provides an information processing apparatus connected to an image pick-up apparatus and a display. The information processing apparatus includes an image obtaining unit, a search target detection unit, a shape recognition unit, an event occurrence unit, a virtual image generation unit, and a display control unit. The image obtaining unit obtains an image of a subject picked up by the image pick-up apparatus. The search target detection unit detects a search target from the image of the subject obtained by the image obtaining unit. The shape recognition unit recognizes a shape of the search target detected by the search target detection unit. The event occurrence unit causes an event to occur in a virtual space in accordance with the shape of the search target recognized by the shape recognition unit. The virtual image generation unit generates a virtual image by shooting the event that occurs by means of the event occurrence unit with a virtual camera arranged in the virtual space. The display control unit causes the display to display the virtual image such that it is visually recognized by a user as superimposed on the image of the subject or on the subject seen through a screen of the display.

According to the exemplary embodiment, since an event is caused to occur in the virtual space in accordance with the recognized shape of the search target, more visual effects for having the user actually feel augmented reality by utilizing the search target can be provided.

An exemplary embodiment provides an information processing method processed by a control unit of an information processing apparatus connected to an image pick-up apparatus and a display. The information processing method includes the steps of obtaining an image of a subject picked up by the image pick-up apparatus, detecting a search target from the obtained image of the subject, recognizing a shape of the detected search target, causing an event to occur in a virtual space in accordance with the recognized shape of the search target, generating a virtual image by shooting the event that occurs with a virtual camera arranged in the virtual space, and causing the display to display the virtual image such that it is visually recognized by a user as superimposed on the image of the subject or on the subject seen through a screen of the display.

According to the exemplary embodiment, since an event is caused to occur in the virtual space in accordance with the recognized shape of the search target, more visual effects for having the user actually feel augmented reality by utilizing the search target can be provided.

An exemplary embodiment provides an information processing system. The information processing system includes a search target arranged in a subject, an image pick-up apparatus for picking up an image of the subject, an information processing apparatus connected to the image pick-up apparatus, and a display connected to the information processing apparatus. The information processing apparatus includes an image obtaining unit for obtaining the image of the subject picked up by the image pick-up apparatus, a search target detection unit for detecting the search target from the image of the subject obtained by the image obtaining unit, a shape recognition unit for recognizing a shape of the search target detected by the search target detection unit, an event occurrence unit for causing an event to occur in a virtual space in accordance with the shape of the search target recognized by the shape recognition unit, a virtual image generation unit for generating a virtual image by shooting the event that occurs by means of the event occurrence unit with a virtual camera arranged in the virtual space, and a display control unit for causing the display to display the virtual image such that it is visually recognized by a user as superimposed on the image of the subject or on the subject seen through a screen of the display.

According to the exemplary embodiment, since an event is caused to occur in the virtual space in accordance with the recognized shape of the search target, more visual effects for having the user actually feel augmented reality by utilizing the search target can be provided.

The foregoing and other objects, features, aspects and advantages of the present invention will become more apparent from the following detailed description of the present invention when taken in conjunction with the accompanying drawings.

Figure 1:
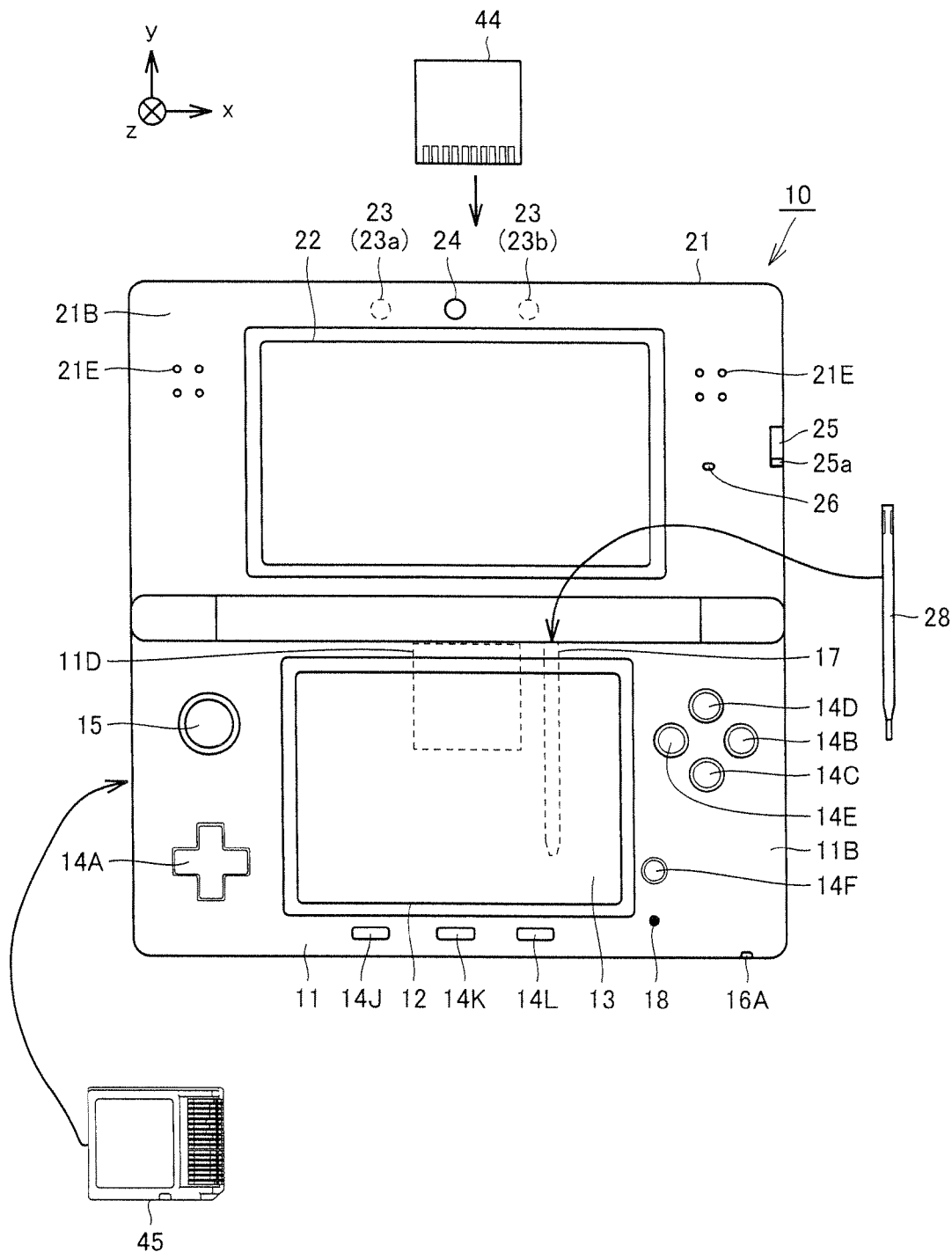
FIG. 1 shows an exemplary illustrative non-limiting front view of an exemplary non-limiting game device in an opened state according to an exemplary embodiment.

DETAILED DESCRIPTION OF NON-LIMITING EXAMPLE EMBODIMENTS (Configuration of Game Device)

A game device according to one embodiment will be described with reference to FIGS. 1 to 5. A game device 10 is a portable game device.

Game device 10 has a lower housing 11 and an upper housing 21. Lower housing 11 and upper housing 21 are connected to each other to allow opening and closing (to be foldable).

(Description of Lower Housing)

Lower housing 11 is provided with a lower LCD (Liquid Crystal Display) 12, a touch panel 13, operation buttons 14A to 14L, an analog stick 15, LEDs 16A to 16B, an insertion port 17, and a microphone hole 18.

Touch panel 13 is attached onto a screen of lower LCD 12. In an upper surface of lower housing 11, insertion port 17 (a dotted line shown in FIGS. 1 and 5) for accommodating a touch pen 28 is provided.

On an inner surface (main surface) of lower housing 11, a cross-shaped button (a direction input button) 14A, a button 14B, a button 14C, a button 14D, a button 14E, a power button 14F, a select button 14J, a HOME button 14K, and a start button 14L are provided.

Analog stick 15 is a device indicating a direction.

In the inner surface of lower housing 11, microphone hole 18 is provided. Under microphone hole 18, a microphone 42 (see FIG. 6) serving as an audio input apparatus is provided.

Figure 2:
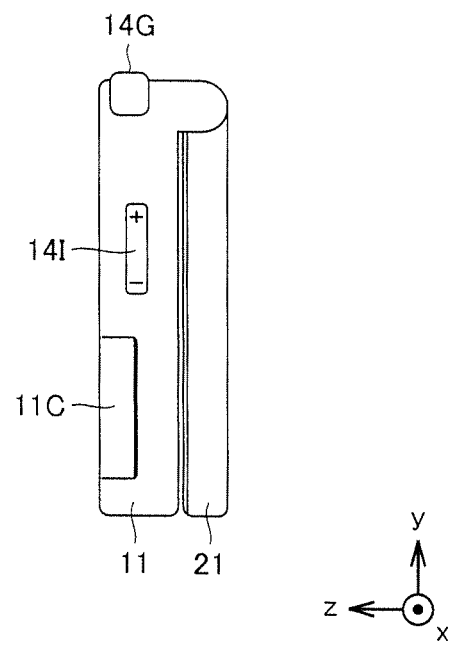
FIG. 2 shows an exemplary illustrative non-limiting left side view of the exemplary non-limiting game device in a closed state according to the exemplary embodiment.
Figure 3:
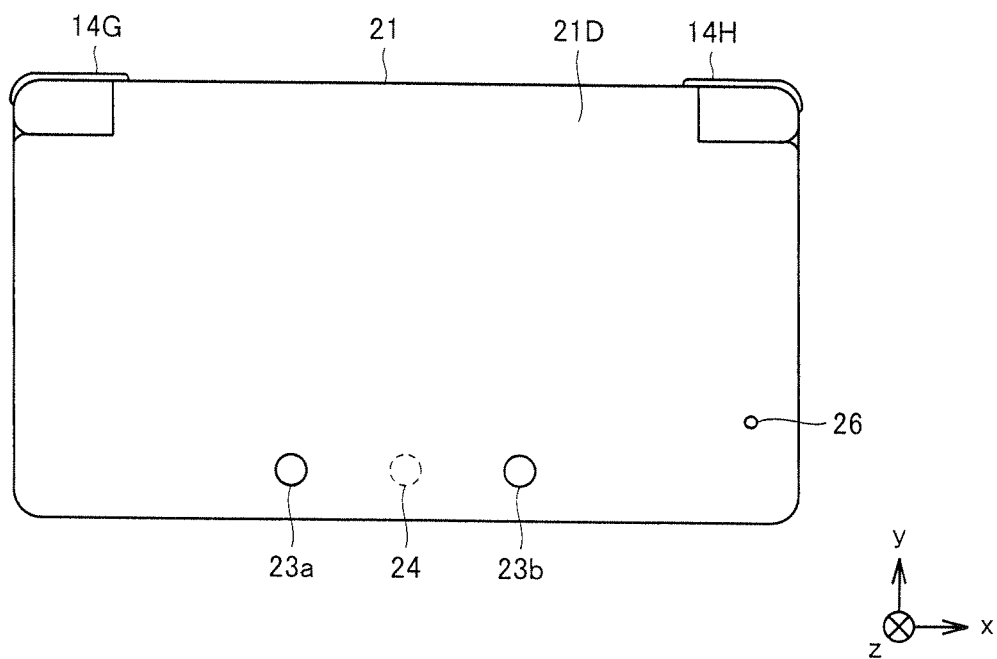
FIG. 3 shows an exemplary illustrative non-limiting top view of the exemplary non-limiting game device in the closed state according to the exemplary embodiment.
Figure 5:
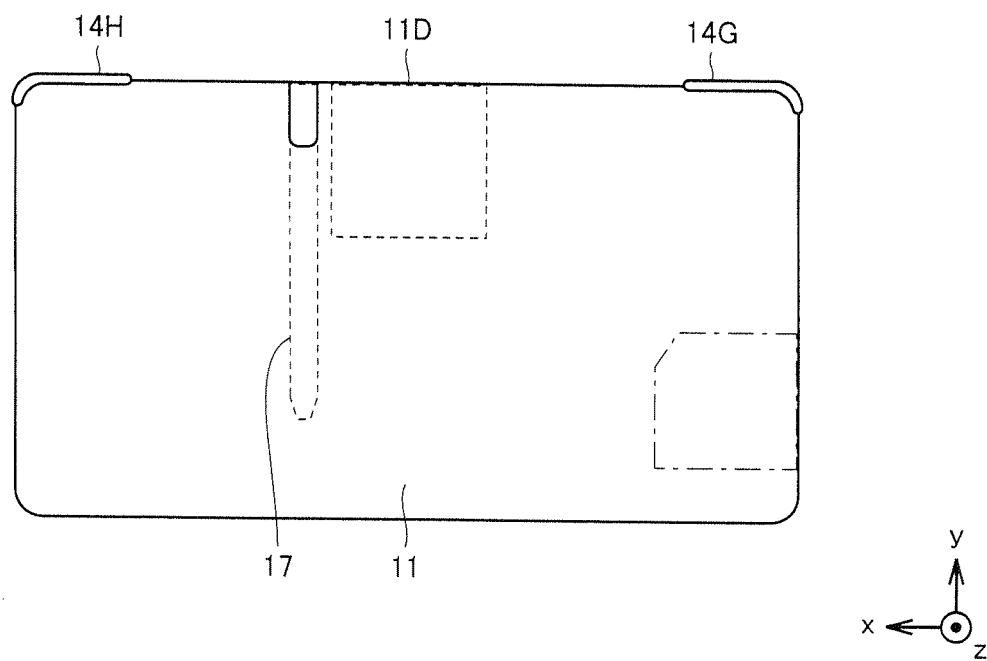
FIG. 5 shows an exemplary illustrative non-limiting bottom view of the exemplary non-limiting game device in the closed state according to the exemplary embodiment.

As shown in FIGS. 3 and 5, an L button 14G and an R button 14H are provided on the upper surface of lower housing 11. In addition, as shown in FIG. 2, on a left side surface of lower housing 11, a sound volume button 14I for adjusting volume of a speaker 43 (see FIG. 6) included in game device 10 is provided.

As shown in FIG. 2, a cover portion 11C that can be opened and closed is provided on the left side surface of lower housing 11. In the inside of this cover portion 11C, a connector for electrically connecting game device 10 and an external memory for data saving 45 to each other is provided.

As shown in FIG. 5, an insertion port 11D for inserting an external memory 44 is provided in the upper surface of lower housing 11.

Figure 4:
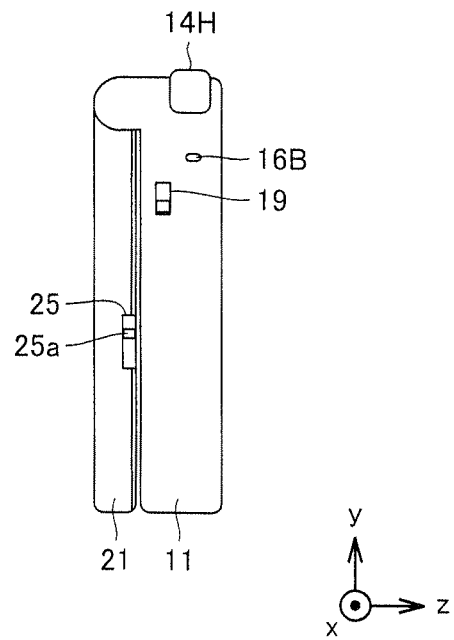
FIG. 4 shows an exemplary illustrative non-limiting right side view of the exemplary non-limiting game device in the closed state according to the exemplary embodiment.

As shown in FIGS. 1 and 4, a first LED 16A for notifying a user of a power ON/OFF state of game device 10 is provided on a lower surface of lower housing 11 and a second LED 16B for notifying the user of a state of establishment of wireless communication of game device 10 is provided on a right side surface of lower housing 11. Game device 10 is capable of establishing wireless communication with other equipment and a wireless switch 19 for activating/inactivating this wireless communication function is provided on the right side surface of lower housing 11 (see FIG. 4).

(Description of Upper Housing)

As shown in FIGS. 1 and 2, upper housing 21 is provided with an upper LCD 22, an outer image pick-up portion 23 (an outer image pick-up portion (left) 23a and an outer image pick-up portion (right) 23b), an inner image pick-up portion 24, a 3D adjustment switch 25, and a 3D indicator 26.

Upper LCD 22 is a display capable of displaying an image that can stereoscopically be viewed. Specifically, upper LCD 22 is a parallax barrier type display allowing stereoscopic vision with naked eyes. Upper LCD 22 can display an image with stereoscopic effect as felt by a user (a stereoscopic image (3D image)) by having the user's left eye visually recognize an image for left eye and the user's right eye visually recognize an image for right eye by using a parallax barrier. In addition, upper LCD 22 can inactivate the parallax barrier above, and when the parallax barrier is inactivated, an image can two-dimensionally be displayed. Thus, upper LCD 22 is a display capable of switching between a stereoscopic display mode for displaying a stereoscopic image and a two-dimensional display mode for two-dimensionally displaying an image (displaying a two-dimensional image). Switching between the display modes is made, for example, by 3D adjustment switch 25 which will be described later.

Outer image pick-up portion 23 is a generic name of two image pick-up portions (23a and 23b) provided on an outer surface 21D of upper housing 21. Outer image pick-up portion (left) 23a and outer image pick-up portion (right) 23b can be used as stereo cameras by a program executed by game device 10.

Inner image pick-up portion 24 is an image pick-up portion provided on an inner surface 21B of upper housing 21 and having an inward direction of normal to the inner surface as a direction of image pick-up.

Three-D adjustment switch 25 is a slide switch and it is a switch used for switching between the display modes of upper LCD 22 as described above. In addition, 3D adjustment switch 25 is used for adjusting stereoscopic effect of an image that is displayed on upper LCD 22 and can stereoscopically be viewed (a stereoscopic image). A slider 25a of 3D adjustment switch 25 can be slid to any position in a prescribed direction (a vertical direction) and a display mode of upper LCD 22 is set in accordance with a position of slider 25a. Further, how a stereoscopic image is viewed is adjusted in accordance with a position of slider 25a.

Three-D indicator 26 is an LED indicating whether upper LCD 22 is in a stereoscopic display mode or not.

Further, a speaker hole 21E is provided in the inner surface of upper housing 21. Voice and sound from speaker 43 which will be described later is output from this speaker hole 21E.

(Internal Configuration of Game Device 10)

Figure 6:
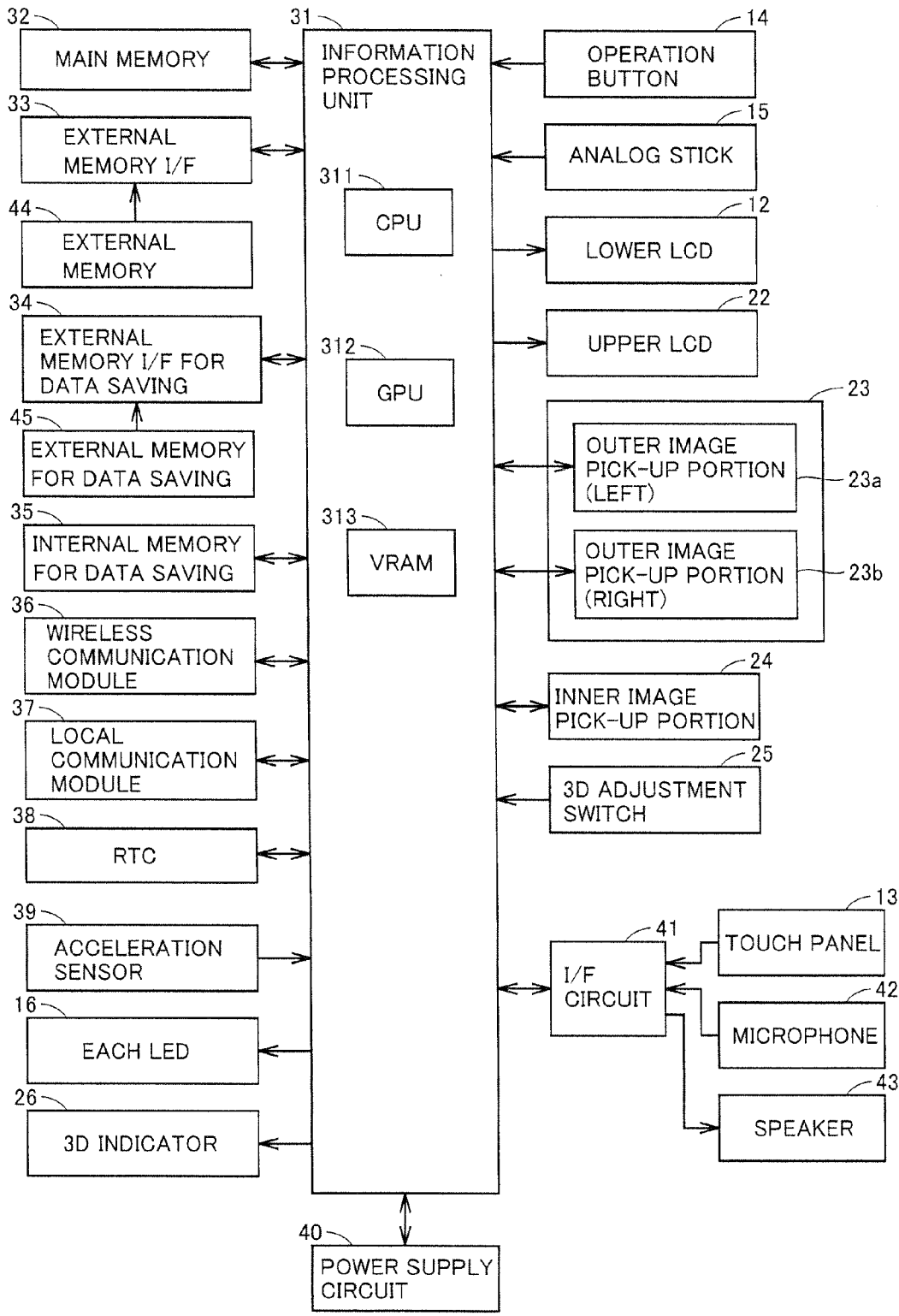
FIG. 6 shows an exemplary illustrative non-limiting block diagram showing an internal structure of the exemplary non-limiting game device according to the exemplary embodiment.

An internal electrical configuration of game device 10 will be described with reference to FIG. 6. As shown in FIG. 6, game device 10 includes, in addition to each portion described above, such electronic components as an information processing unit 31, a main memory 32, an external memory interface (external memory I/F) 33, an external memory I/F for data saving 34, an internal memory for data saving 35, a wireless communication module 36, a local communication module 37, a real time clock (RTC) 38, an acceleration sensor 39, a power supply circuit 40, and an interface circuit (I/F circuit) 41.

Information processing unit 31 includes a CPU (Central Processing Unit) 311 for executing a prescribed program, a GPU (Graphics Processing Unit) 312 for performing image processing, and a VRAM (Video RAM) 313. CPU 311 performs processing in accordance with a program by executing the program stored in a memory in game device 10 (such as external memory 44 connected to external memory I/F 33 or internal memory for data saving 35). It is noted that a program executed by CPU 311 may be obtained from other equipment through communication with other equipment. GPU 312 generates an image in response to an instruction from CPU 311 and renders the image in VRAM 313. The image rendered in VRAM 313 is output to upper LCD 22 and/or lower LCD 12 so that the image is displayed on upper LCD 22 and/or lower LCD 12.

External memory I/F 33 is an interface for removably connecting external memory 44. In addition, external memory I/F for data saving 34 is an interface for removably connecting external memory for data saving 45.

Main memory 32 is a volatile storage device used as a work area or a buffer area of (CPU 311 of) information processing unit 31.

External memory 44 is a non-volatile storage device for storing a program and the like executed by information processing unit 31. External memory 44 is implemented, for example, by a read-only semiconductor memory.

External memory for data saving 45 is implemented by a non-volatile readable and writable memory (such as a NAND type flash memory) and used for saving any data.

Internal memory for data saving 35 is implemented by a non-volatile readable and writable memory (such as a NAND type flash memory) and used for storing prescribed data. For example, internal memory for data saving 35 stores data or a program downloaded through wireless communication via wireless communication module 36.

Wireless communication module 36 has a function to establish connection to wireless LAN under a scheme complying, for example, with IEEE802.11b/g standard. Local communication module 37 has a function to establish wireless communication with a game device of the same type under a prescribed communication scheme (such as communication under an original protocol or infrared communication).

Acceleration sensor 39 detects magnitude of acceleration in a direction of a straight line (linear acceleration) along each direction of three axes (xyz axes). Information processing unit 31 can detect an orientation or motion of game device 10 as it receives data indicating acceleration (acceleration data) detected by acceleration sensor 39.

RTC 38 counts time and outputs the time to information processing unit 31. Information processing unit 31 calculates the current time (date) based on the time counted by RTC 38. Power supply circuit 40 controls electric power from a power supply (a chargeable battery) included in game device 10 and causes supply of electric power to each component in game device 10.

Touch panel 13, microphone 42 and speaker 43 are connected to I/F circuit 41. I/F circuit 41 includes an audio control circuit for controlling microphone 42 and speaker 43 (an amplifier) and a touch panel control circuit for controlling the touch panel. The audio control circuit carries out A/D conversion and D/A conversion of an audio signal and conversion of an audio signal to audio data in a prescribed format. The touch panel control circuit generates touch position data in a prescribed format based on a signal from touch panel 13 and outputs the touch position data to information processing unit 31. As information processing unit 31 obtains the touch position data, it can know a position where input onto touch panel 13 has been made.

Operation button 14 consists of operation buttons 14A to 14L above and operation data indicating a status of input to operation buttons 14A to 14I (whether an operation button has been pressed or not) is output from operation button 14 to information processing unit 31.

Lower LCD 12 and upper LCD 22 are connected to information processing unit 31. Specifically, information processing unit 31 is connected an LCD controller (not shown) of upper LCD 22 and controls the LCD controller to turn ON/OFF the parallax barrier. When the parallax barrier of upper LCD 22 is turned ON, an image for right eye and an image for left eye stored in VRAM 313 of information processing unit 31 are output to upper LCD 22. More specifically, the LCD controller reads the image for right eye and the image for left eye from VRAM 313 by alternately repeating processing for reading pixel data for one line in a vertical direction with regard to the image for right eye and processing for reading pixel data for one line in the vertical direction with regard to the image for left eye. Thus, the image for right eye and the image for left eye are each divided into strip-like images in which pixels are aligned vertically for each one line, and an image in which strip-like images of the image for right eye and strip-like images of the image for left eye as divided are alternately arranged is displayed on a screen of upper LCD 22. Then, as the image is visually recognized by the user through the parallax barrier of upper LCD 22, the user's right and left eyes visually recognize the image for right eye and the image for left eye respectively. As described above, an image that can stereoscopically be viewed is displayed on the screen of upper LCD 22.

Outer image pick-up portion 23 and inner image pick-up portion 24 pick up an image in response to an instruction from information processing unit 31 and output data of the picked-up image to information processing unit 31.

Three-D adjustment switch 25 transmits an electric signal in accordance with a position of slider 25a to information processing unit 31.

Information processing unit 31 controls illumination of 3D indicator 26. For example, when upper LCD 22 is in a stereoscopic display mode, information processing unit 31 causes 3D indicator 26 to illuminate.

(Outlines of Game)

Outlines of a game executed on game device 10 will be described with reference to FIGS. 7 to 10. This game is a game making use of an augmented reality technique and played while an image of a marker 50 in a prescribed design (a character, a number, a symbol, other designs) drawn in a note coming together with game software is picked up by outer image pick-up portion 23 of game device 10.

Figure 7:
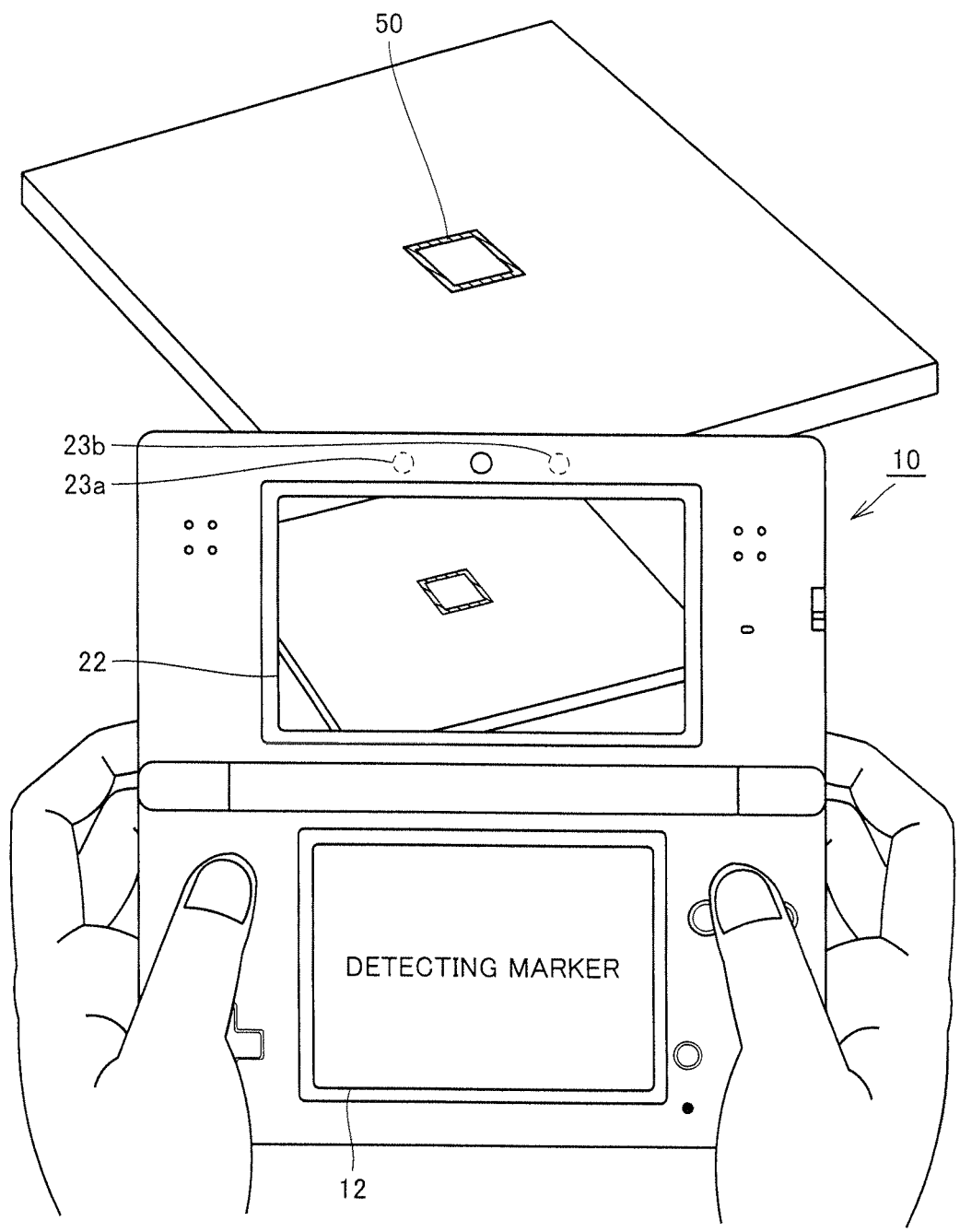
FIGS. 7 to 10 each show an exemplary illustrative non-limiting game image of the exemplary non-limiting game device according to the exemplary embodiment while a game is being played.

A game image example shown in FIG. 7 shows a game image displayed on upper LCD 22 and lower LCD 12 when marker 50 is detected immediately after the game is started.

On upper LCD 22, an image of a note (a subject) currently picked up by outer image pick-up portion 23 and an image of marker 50 drawn in the note are displayed. In this example, marker 50 is a square marker arranged substantially in a central portion of the note.

On lower LCD 12, information indicating that marker 50 is being detected (for example, "detecting marker") is displayed. When game device 10 failed to detect marker 50, game device 10 may display such information as "Marker has not been detected. Please perform again processing for detecting marker." on lower LCD 12. When game device 10 detects marker 50, game device 10 may display such information as "Marker has been detected." on lower LCD 12.

Figure 8:
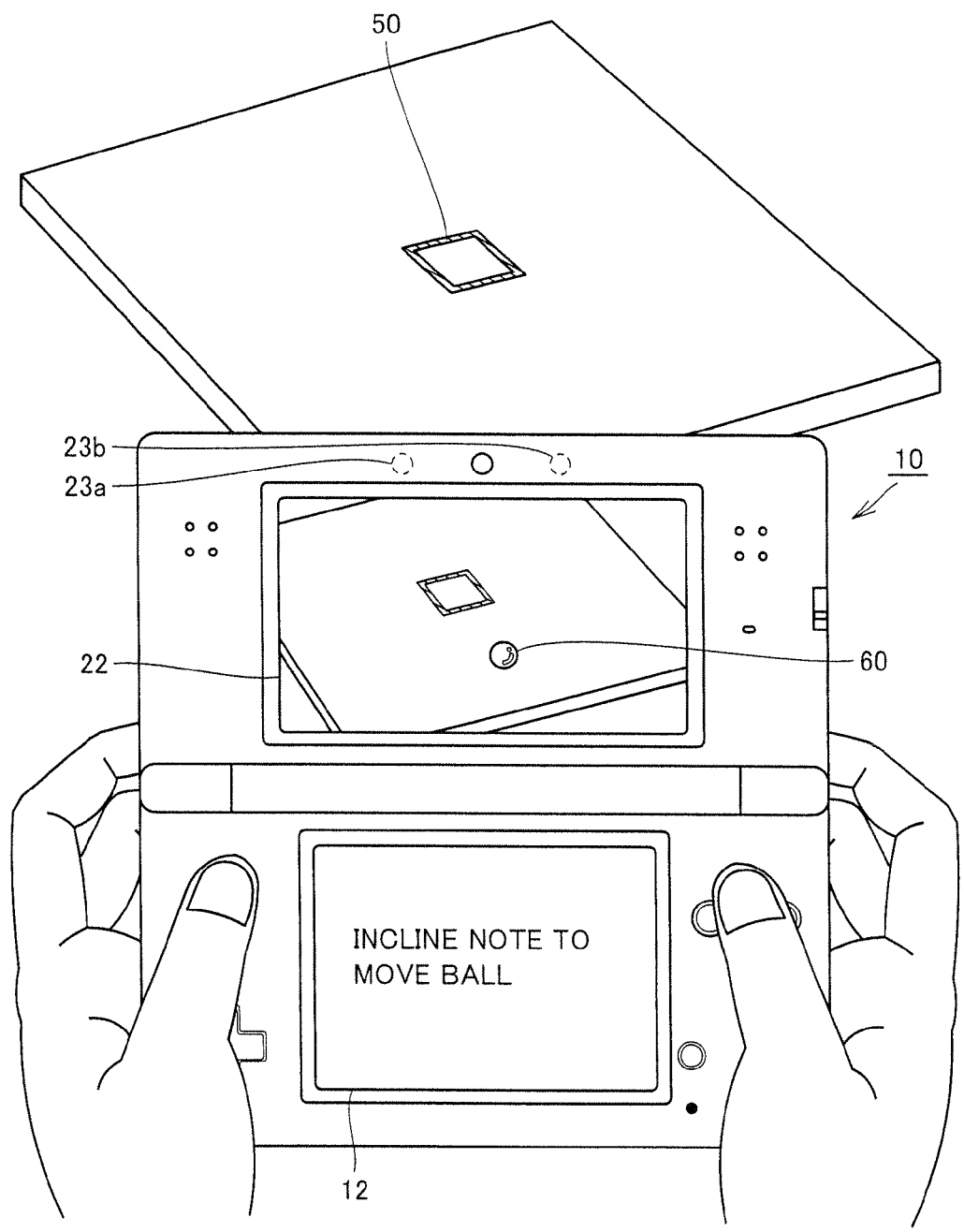

When marker 50 is successfully detected, game device 10 causes a first event to occur. As a result of the first event that occurred, on upper LCD 22, as shown in FIG. 8, a ball object 60 arranged in the vicinity of marker 50 is displayed. It is noted that, in order to provide the game with an effect, game device 10 may reproduce a motion picture in a region within marker 50 on upper LCD 22.

Game device 10 may display description of the game on lower LCD 12. For example, game device 10 displays such information as "incline note to move ball" on lower LCD 12. Such an indication is a guide for having the user make transition to the second event.

Figure 9:
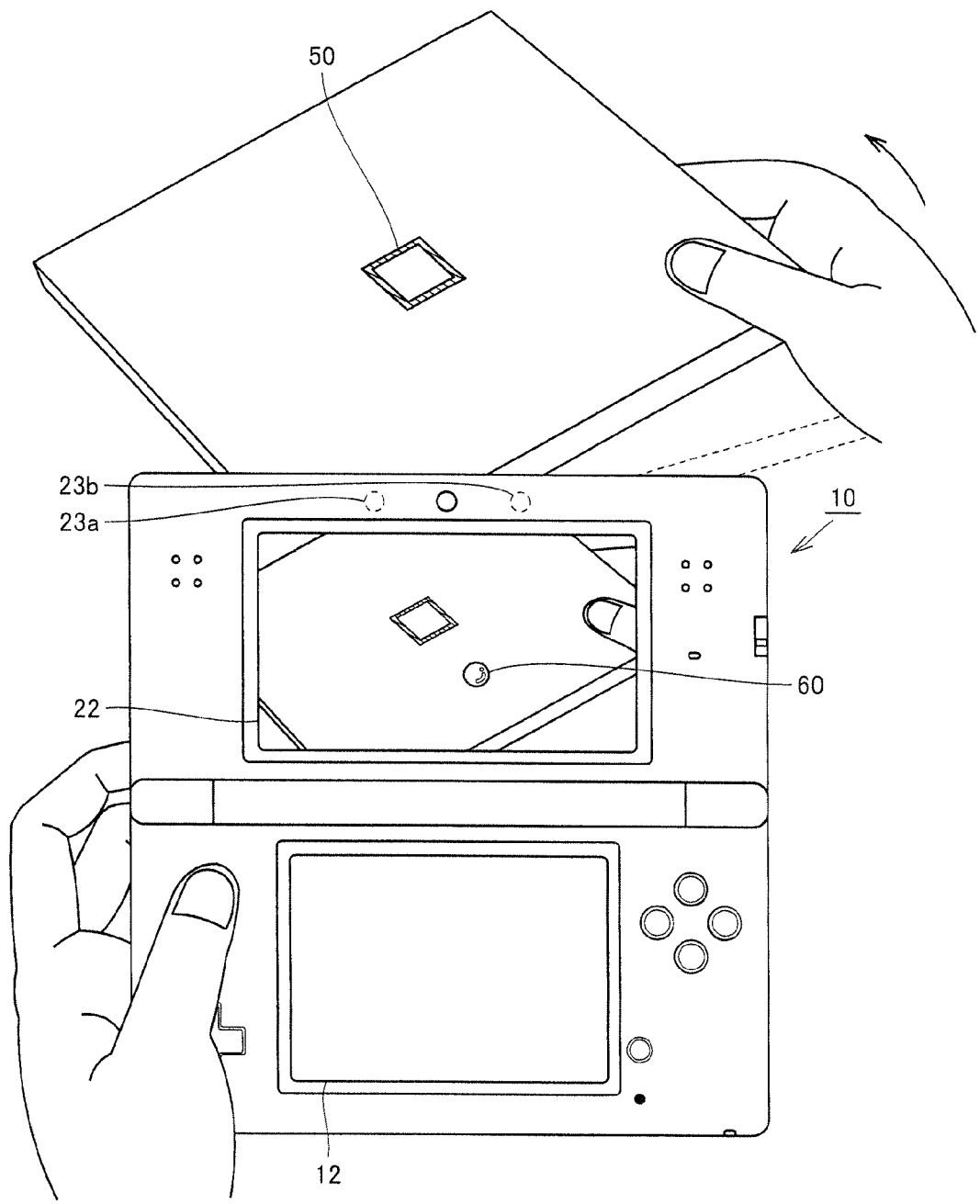

Then, as shown in FIG. 9, the user lifts the right end of the note to incline the note. As the note is inclined, game device 10 picks up with outer image pick-up portion 23, an image of marker 50 in a shape deformed as compared with the shape of marker 50 before inclination of the note. It is noted that game device 10 maintains an orientation before the note is inclined.

Figure 10:
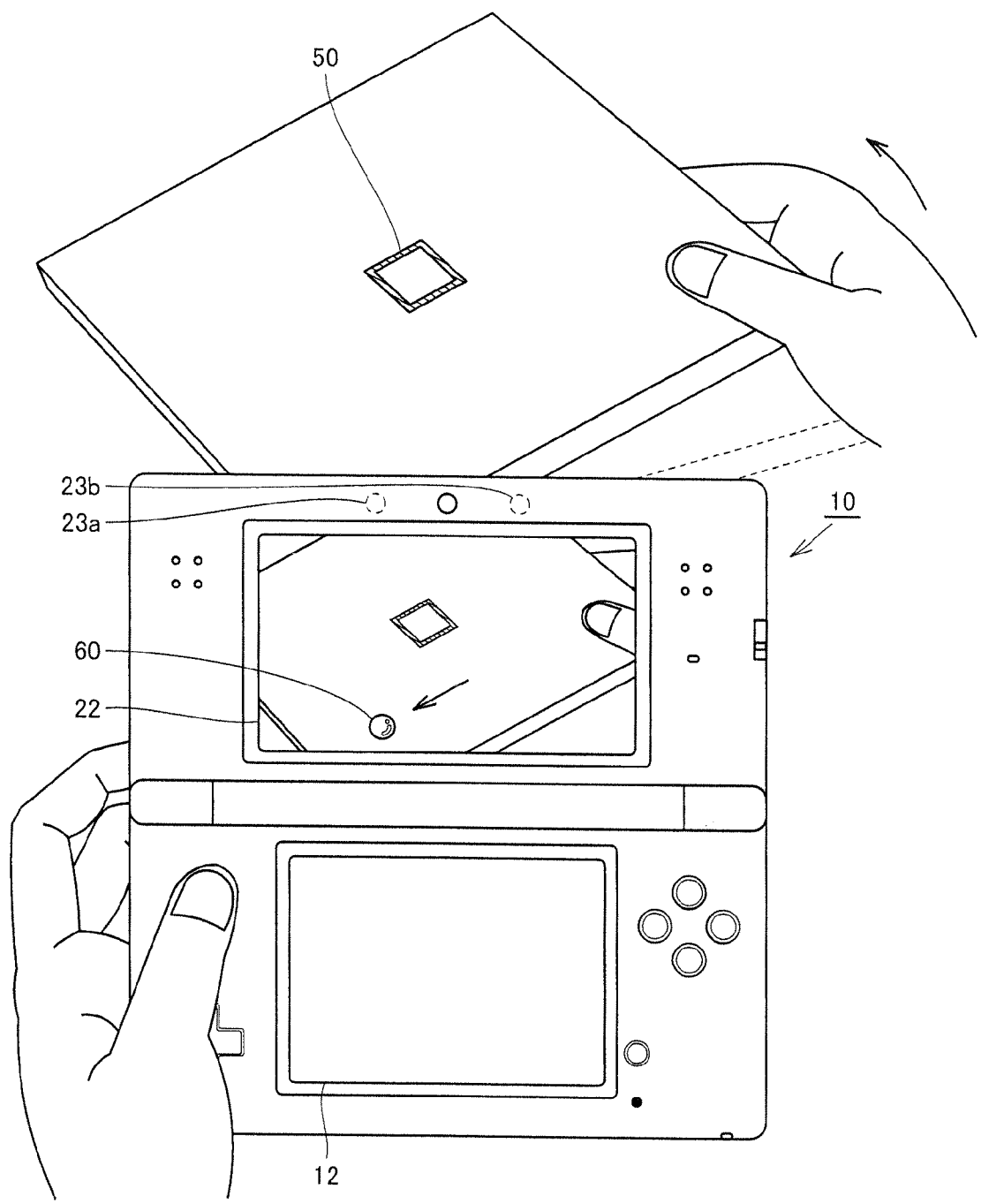

When the shape of marker 50 of which image has been picked up deforms to a prescribed shape, game device 10 causes the second event to occur. Namely, game device 10 recognizes inclination of the note to such an extent that the ball moves, based on deformation of marker 50, and causes the second event in which ball object 60 moves to occur. As shown in FIG. 10, as a result of occurrence of the second event, game device 10 displays on upper LCD 22, a manner in which ball object 60 moves over the inclined note.

(Operation of Game Device 10)

An operation of game device 10 will now be described in further detail with reference to FIGS. 11 to 15.

Figure 11:
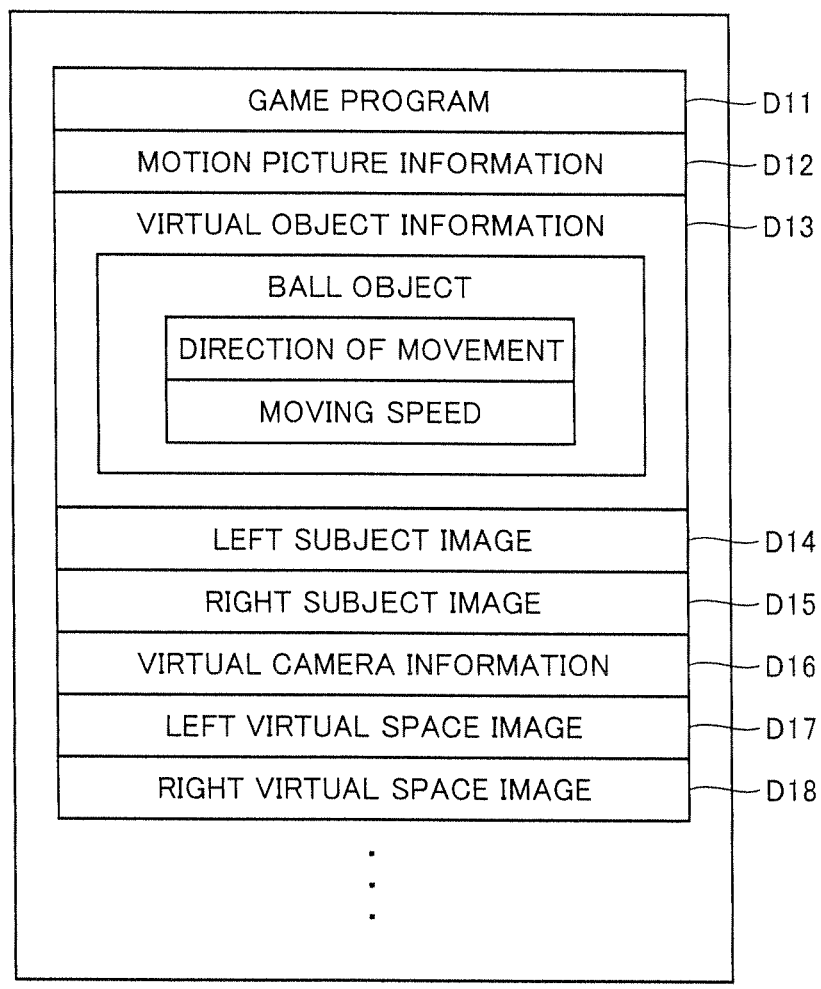
FIG. 11 shows an exemplary illustrative non-limiting schematic diagram showing a memory map of the exemplary non-limiting game device according to the exemplary embodiment.

Main memory 32 shown in FIG. 11 includes a game program D11, motion picture information D12, virtual object information D13, a left subject image D14, a right subject image D15, virtual camera information D16, a left virtual space image D17, a right virtual space image D18, and the like.

Game program D11 is read from external memory 44, internal memory for data saving 35 or the like and stored in main memory 32 prior to play of the game. It is noted that game program D11 may be received from a server apparatus or another game device by using a wireless communication function and stored in main memory 32.

Motion picture information D12 is motion picture information displayed in the first event or the like, and it is motion picture information compressed based on such motion picture compression standards as H.264, MPEG-4 AVC, or the like.

Virtual object information D13 is information relating to various virtual objects (ball object 60) arranged in the virtual space and it includes such information as a shape, a color, a design, a position, and an orientation of a virtual object. Regarding ball object 60, information on a direction of movement and a moving speed is also included.

Left subject image D14 is an image of a subject picked up by outer image pick-up portion (left) 23*a* and right subject image D15 is an image of a subject picked up by outer image pick-up portion (right) 23*b*.

Virtual camera information D16 is information on a pair of virtual cameras (a left virtual camera and a right virtual camera which will be described later) used in generating a stereoscopic image, and it includes such information as a position or an orientation of each virtual camera in the virtual space.

Left virtual space image D17 is a virtual image rendered based on the left virtual camera and right virtual space image D18 is a virtual image rendered based on the right virtual camera.

Figure 12:
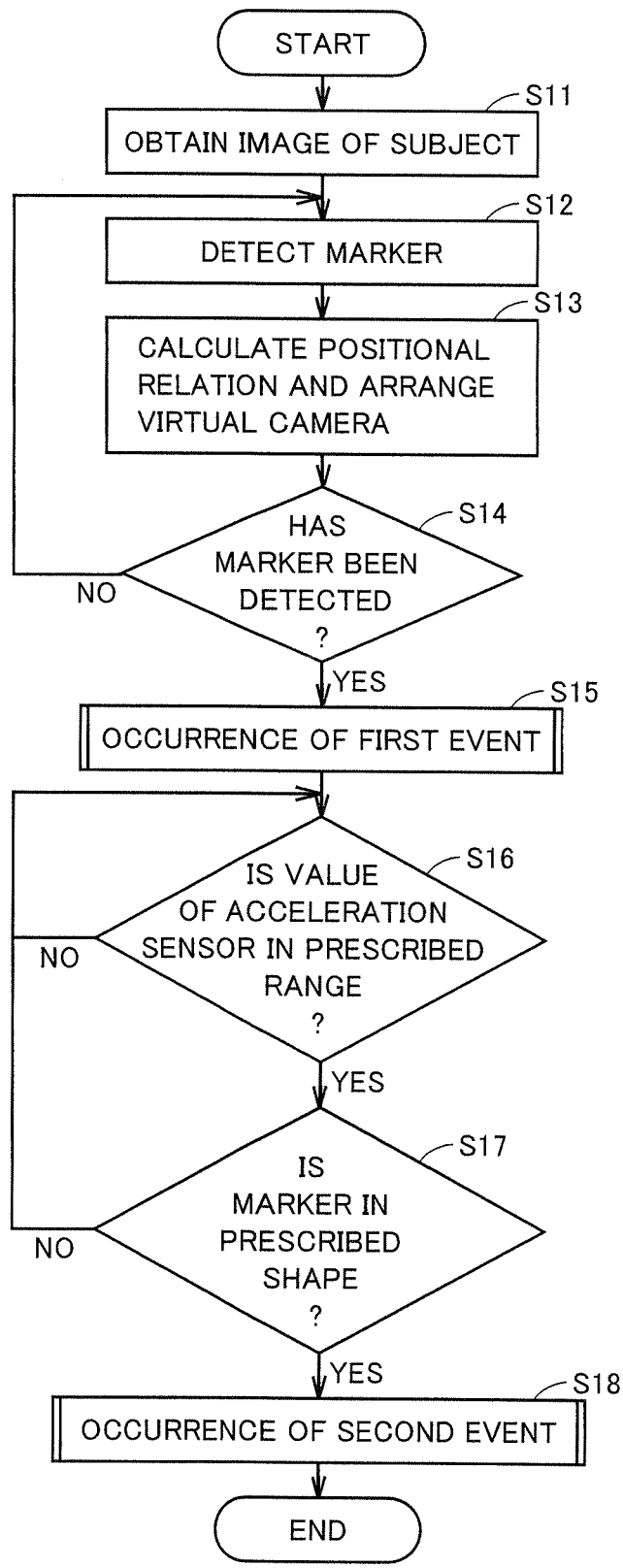
FIG. 12 shows an exemplary illustrative non-limiting flowchart for illustrating an operation of the exemplary non-limiting game device according to the exemplary embodiment.

Flow of game processing performed by CPU 311 based on game program D11 will be described with reference to FIG. 12. The game processing is started, for example, when button 14B of operation button 14 is pressed while an image of a subject is picked up by outer image pick-up portion 23.

Initially, CPU 311 obtains most recent left subject image D14 and right subject image D15 from outer image pick-up portion (left) 23*a* and outer image pick-up portion (right) 23*b* and causes main memory 32 to store the images (step S11).

Then, CPU 311 detects marker 50 from the obtained image of the subject (step S12). In the marker detection processing, marker 50 in each of left subject image D14 and right subject image D15 is detected. For example, left subject image D14 and right subject image D15 are each subjected to edge detection processing and pattern matching processing, so as to detect marker 50 in each of left subject image D14 and right subject image D15. Here, in the edge detection processing, a series of edge pixels representing a contour of marker 50 is detected from left subject image D14 and right subject image D15 and a plurality of straight lines are generated based on the series of edge pixels, to thereby detect vertices of the contour.

Marker 50 is not limited to the square marker arranged substantially in the central portion of the note as shown in FIG. 7, and it may be an any shape so long as it is in a shape that can be detected from the obtained image of the subject. In addition, marker 50 is not limited to a single marker and a plurality of markers may be arranged in the note.

Then, CPU 311 calculates positional relation between outer image pick-up portion 23 and marker 50 in the real space based on four vertices of marker 50 and calculates a position and an orientation of the virtual camera in the virtual space based on this result of calculation, and the virtual camera is installed such that positional relation between outer image pick-up portion 23 and marker 50 in the real space and positional relation between the virtual camera and the marker in the virtual space correspond to each other (step S13). Processing for calculating a position of the virtual camera based on the positional relation above may be similar to that in a conventional augmented reality feeling technique. It is noted that processing for calculating a position and an orientation of the virtual camera in the virtual space and installing the virtual camera is performed at a certain interval and it is performed also during processing of each event which will be described later. In a subsequent flowchart, however, the processing is assumed as being performed at a certain interval including during processing of each event which will be described later, although the description may not be provided.

Then, CPU 311 determines whether it has detected marker 50 or not (step S14). When CPU 311 determines that it failed to detect marker 50 (step S14: NO), the process returns to step S12 and processing for detecting marker 50 from the obtained image of the subject is continued. When CPU 311 determines that it has detected marker 50 (step S14: YES), CPU 311 causes the first event to occur (step S18).

Figure 13:
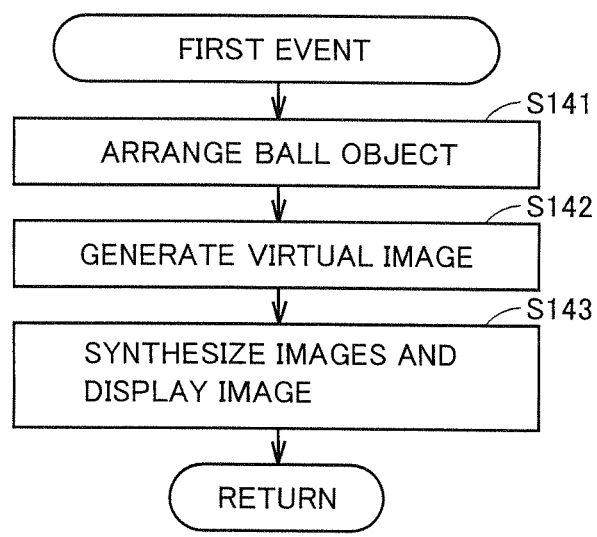
FIG. 13 shows an exemplary illustrative non-limiting flowchart for illustrating processing of a first event shown in FIG. 12.
Figure 14:
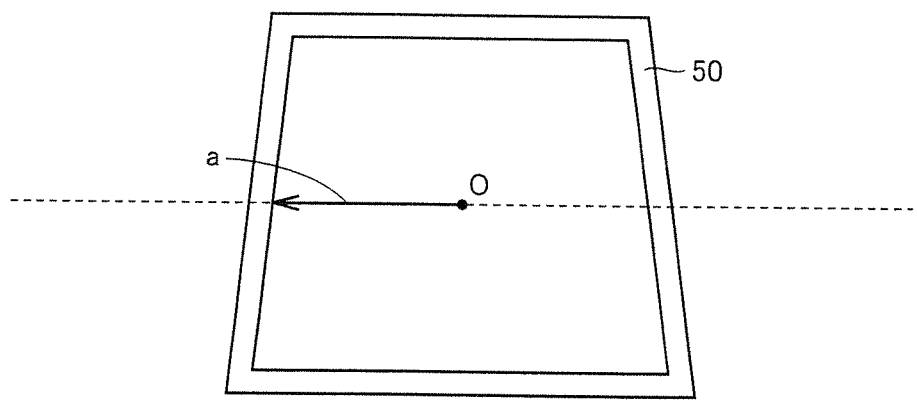
FIG. 14 shows an exemplary illustrative non-limiting diagram for illustrating a method of recognizing a shape of a marker in the exemplary non-limiting game device according to the exemplary embodiment.
Figure 14:
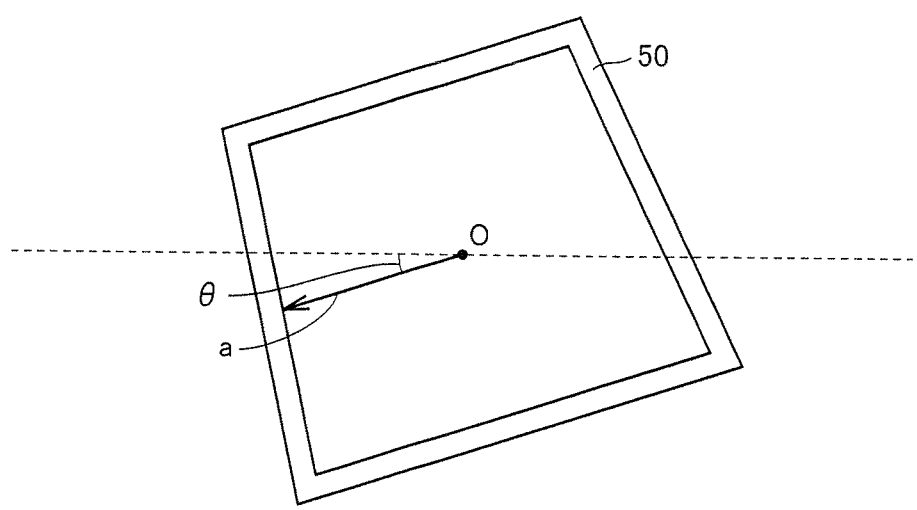

Processing of the first event that occurred will now be described with reference to FIG. 13. Initially, CPU 311 arranges ball object 60 at a prescribed position with the origin in the virtual space serving as the reference, the origin being the center of marker 50 (step S141).

After CPU 311 arranged ball object 60, CPU 311 generates a virtual image in the virtual space by picking up an image of the virtual space including ball object 60 with the virtual camera (step S142). Specifically, CPU 311 generates left virtual space image D17 by rendering a virtual object (such as ball object 60) based on the left virtual camera and generates right virtual space image D18 by rendering a virtual object based on the right virtual camera. It is noted that processing for rendering the virtual space is typically performed by GPU 312 in response to an instruction from CPU 311.

After CPU 311 generates a virtual image, CPU 311 synthesizes the image of the subject with the virtual image and causes upper LCD 22 to display the resultant image (step S143). Specifically, CPU 311 overwrites left subject image D14 with left virtual space image D17 (that is, ball object 60 rendered based on the left virtual camera) and overwrites right subject image D15 with right virtual space image D18 (that is, ball object 60 rendered based on the right virtual camera). Then the synthesized image is displayed on upper LCD 22. Namely, CPU 311 causes upper LCD 22 to display a 3D image, with the synthesized image of left subject image D14 and left virtual space image D17 serving as an image for left eye and the synthesized image of right subject image D15 and right virtual space image D18 serving as an image for right eye. The processing of the first event ends when ball object 60 is displayed on upper LCD 22.

It is noted that CPU 311 may read motion picture information D12 from main memory 32 and reproduce the motion picture in the region within marker 50. Specifically, a method of reproducing the motion picture in the region within marker 50 will be described. CPU 311 arranges a plate-shaped polygon in the virtual space in response to the first event that occurred. CPU 311 generates a virtual image by mapping an image of motion picture information D12 as a texture on the arranged plate-shaped polygon. CPU 311 reproduces the motion picture by successively displaying the virtual images on upper LCD 22 such that the generated virtual images as superimposed on the image of the subject are visually recognized by the user.

Referring back to FIG. 12, CPU 311 receives data indicating acceleration detected by acceleration sensor 39 (a value of acceleration sensor 39) in order to detect an orientation or motion of game device 10. CPU 311 determines whether the received value of acceleration sensor 39 indicates that game device 10 is horizontal or not (step S16). Namely, CPU 311 determines whether game device 10 is horizontal or not based on the value of acceleration sensor 39. Specifically, when the value of acceleration sensor 39 is not in a prescribed range, CPU 311 can determine that game device 10 is not horizontal, and when the value of acceleration sensor 39 is in the prescribed range, it can determine that game device 10 is horizontal.

When CPU 311 determines that the received value of acceleration sensor 39 is not in the prescribed range (step S16: NO), CPU 311 continues processing for receiving the value of acceleration sensor 39. When CPU 311 determines that the received value of acceleration sensor 39 is in the prescribed range (step S16: YES), it recognizes the shape of marker 50.

By recognizing the shape of marker 50, CPU 311 can detect whether the user has inclined the note or not. An image of marker 50 shown in FIG. 14(a) has been picked up by outer image pick-up portion 23 from slightly diagonally below with respect to the front of marker 50 while the note is placed on a desk. Therefore, the shape of marker 50 shown in FIG. 14(a) is in a trapezoidal shape longer on the bottom side.

An image of marker 50 shown in FIG. 14(b) has been picked up by outer image pick-up portion 23 from a position the same as in FIG. 14(a) while the note is inclined as the right end of the note is lifted as shown in FIG. 9. Therefore, the shape of marker 50 shown in FIG. 14(b) is in a deformed trapezoidal shape, unlike the shape of marker 50 shown in FIG. 14(a).

In order to recognize the shape of marker 50, CPU 311 makes use of information on an orientation of a vector a extending from a center O of marker 50 toward a point intermediate in one side of marker 50. Namely, CPU 311 recognizes deformation of the shape of marker 50 as variation in orientation of vector a. Specifically, vector a shown in FIG. 14(a) is oriented toward the left along a horizontal direction, whereas vector a shown in FIG. 14(b) is oriented toward lower left by an angle θ with respect to the horizontal direction. Therefore, CPU 311 can easily recognize deformation of the shape of marker 50 by decreasing an amount of information to be processed as a result of recognition of the shape of marker 50 based on the orientation of vector a.

It is noted that a method of recognizing the shape of marker 50 is not limited to the method of using an orientation of vector a, and the shape of marker 50 may be recognized in pattern matching processing by using an image picked up by outer image pick-up portion 23.

Referring back to FIG. 12, CPU 311 determines whether the recognized shape of marker 50 has deformed to a prescribed shape or not (step S17). Namely, CPU 311 determines that the recognized shape of marker 50 has deformed to the prescribed shape when angle θ of the orientation of vector a shown in FIG. 14(b) with respect to the orientation of vector a shown in FIG. 14(a) attains to a prescribed angle.

When CPU 311 determines that the recognized shape of marker 50 has not deformed to the prescribed shape (step S17: NO), the process returns to step S16 and processing for receiving the value of acceleration sensor 39 is continued. When CPU 311 determines that the recognized shape of marker 50 has deformed to the prescribed shape (step S17: YES), it causes the second event to occur (step S18).

Here, the reason why CPU 311 receives the value of acceleration sensor 39 before recognition of the shape of marker 50 is to distinguish whether deformation of the shape of marker 50 is caused by inclination of the note or by inclination of a main body of game device 10. Namely, since game device 10 according to the present embodiment adheres to the specifications that the second event is caused to occur by inclination of the note, the second event is not caused to occur if it is determined that the main body of game device 10 has been inclined, based on the value from acceleration sensor 39 detecting an orientation or motion of game device 10 (a result of detection). Game device 10, however, is not limited to the specifications above, and the shape of marker 50 may be recognized without taking into consideration the value from acceleration sensor 39 detecting an orientation or motion of game device 10. Namely, game device 10 may adhere to such specifications that the second event is caused to occur without distinguishing between inclination of the note and inclination of the main body of game device 10.

Figure 15:
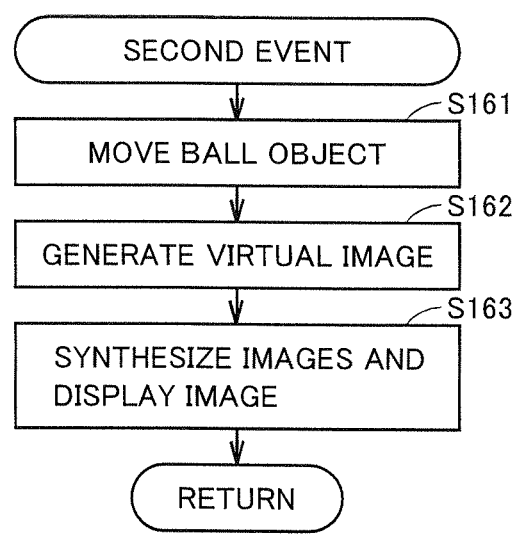
FIG. 15 shows an exemplary illustrative non-limiting flowchart for illustrating processing of a second event shown in FIG. 12.

Processing of the second event that occurred will now be described with reference to FIG. 15. Initially, CPU 311 moves arranged ball object 60 (step S161). Specifically, CPU 311 determines a direction of movement and a moving speed of ball object 60 in consideration of virtual object information D13 read from main memory 32, a degree of inclination of the note (a degree of deformation of the shape of marker 50), and the like. For example, CPU 311 determines that ball object 60 is to be moved at a fast speed toward the left. Then, when CPU 311 moved ball object 60 based on the determination, CPU 311 updates a position of moved ball object 60.

CPU 311 generates a virtual image in the virtual space by picking up an image of the virtual space including moving ball object 60 with the virtual camera (step S162). Specifically, CPU 311 generates left virtual space image D17 by rendering moving ball object 60 based on the left virtual camera and generates right virtual space image D18 by rendering moving ball object 60 based on the right virtual camera.

It is noted that, by using the virtual camera arranged in the processing of the first event, it is not necessary to again arrange the virtual camera. If the virtual camera is to be arranged again, CPU 311 again calculates positional relation between outer image pick-up portions 23a, 23b and marker 50 and again arranges a pair of virtual cameras (the left virtual camera and the right virtual camera) in the virtual space based on the positional relation again calculated.

After the virtual image is generated, CPU 311 synthesizes the image of the subject with the virtual image and causes upper LCD 22 to display the resultant image (step S163). Specifically, CPU 311 successively overwrites left subject image D14 with moving ball object 60 rendered based on the left virtual camera and successively overwrites right subject image D15 with moving ball object 60 rendered based on the right virtual camera. Thus, the user can be caused to recognize that ball object 60 moves in the virtual space. It is noted that, similarly, the synthesized image is displayed on upper LCD 22. Namely, CPU 311 causes upper LCD 22 to display a 3D image, with the synthesized image of left subject image D14 and left virtual space image D17 serving as an image for left eye and the synthesized image of right subject image D15 and right virtual space image D18 serving as an image for right eye.

Referring back to FIG. 12, CPU 311 ends the game after processing of the second event ended. It is noted that the process may return to step S12 and CPU 311 may continue processing for detecting marker 50 from the obtained image of the subject, without ending the game.

As described above, game device 10 obtains an image of a subject picked up by outer image pick-up portion 23, detects marker 50 from the obtained image of the subject, recognizes a shape of detected marker 50, causes an event to occur in the virtual space in accordance with the recognized shape of marker 50, generates a virtual image in the virtual space in accordance with the event that occurs, and causes upper LCD 22 to display the virtual image such that the virtual image is visually recognized by the user as superimposed on the image of the subject. Thus, more visual effects for having the user actually feel augmented reality by making use of marker 50 can be given.

(Variation)

In addition, in the embodiment above, upper LCD 22 displays a synthesized image of an image of the subject picked up by outer image pick-up portion 23 and a virtual image (a video see-through type), however, the embodiment is not limited as such. In other embodiments, such an optical see-through type game device (for example, a game device including a head-mount display) or game system that a virtual object is displayed on a transmissive type display screen and the virtual object is visually recognized by the user as if the virtual object were actually present in the subject seen through the transmissive type display screen is also applicable.

Moreover, in the embodiment above, though a position and an orientation of the left virtual camera and a position and an orientation of the right virtual camera are individually determined in accordance with results in the marker detection processing, in other embodiments, a position and an orientation of any one virtual camera may be determined in accordance with results in the marker detection processing and thereafter a position and an orientation of the other virtual camera may be determined based on the position and the orientation of one virtual camera.

Further, in the embodiment above, though a position and an orientation of the virtual camera are determined based on a position and an orientation of marker 50 included in the image of the subject, in other embodiments, a position or the like of the virtual camera may be determined based on a position or the like of a recognition target (for example, a face, a hand, and the like) other than marker 50 included in the image of the subject.

Furthermore, in the embodiment above, though an example where a stereoscopic image is displayed on upper LCD 22 has been described, a case where a two-dimensional image is displayed is also applicable, without limited as such. For example, one virtual camera should only be arranged in the virtual space based on the image of the subject obtained from any one of outer image pick-up portion (left) 23a and outer image pick-up portion (right) 23b and then processing as in the embodiment above should only be performed.

Further, in the embodiment above, though an example where a note where marker 50 is drawn is used has been described, a case where marker 50 is drawn on a common credit card or a card having a size as large as a business card is also applicable, without limited as such. Here, a card in which marker 50 is drawn may simply be referred to as a marker.

In addition, in the embodiment above, though an example in which processing of game program D11 is performed by the CPU (CPU 311) has been described, in other embodiments, at least partial processing of game program D11 may be performed only by hardware.

Moreover, in the embodiment above, though description has been given with reference to the game example above, the embodiment is applicable to any such game as causing an event to occur as the shape of marker 50 deforms, without limited as such. Any application software is also applicable, without limited to game software.

Furthermore, in the embodiment above, though portable game device 10 has been described, in other embodiments, any information processing apparatus (a stationary game device, a desktop personal computer, a notebook personal computer, a portable telephone, and the like) may be made use of as a game device or a game system.

In addition, in the embodiment above, though an example where processing of game program D11 is performed by a single CPU (CPU 311) has been described, in other embodiments, processing of game program D11 may be performed by a plurality of processors as distributed. The plurality of processors may be contained in the same information processing apparatus or may be provided as distributed in a plurality of information processing apparatuses capable of communicating with one another, such as a server apparatus and a client apparatus.

While certain example systems, methods, devices, and apparatuses have been described herein, it is to be understood that the appended claims are not to be limited to the systems, methods, devices, and apparatuses disclosed, but on the contrary, are intended to cover various modifications and equivalent arrangements included within the spirit and scope of the appended claims.

What is claimed is:

1. A non-transitory storage medium encoded with a computer readable information processing program and executable by a computer of an information processing apparatus connected to an image pick-up apparatus and a display, the information processing program, when executed, causing the computer to control the information processing apparatus to perform operations comprising:
   obtaining an image of a subject picked up by the image pick-up apparatus;
   detecting a search target from the obtained image of the subject;
   causing a first event to occur when the search target is successfully detected;
   recognizing a shape of the detected search target;
   causing a second event to occur in a virtual space in accordance with a deformation of the recognized shape of the search target, wherein the second event is caused to occur when the shape of the search target deforms to a prescribed shape subsequent to occurrence of the first event;
   generating a virtual image by shooting the second event that occurs with a virtual camera arranged in the virtual space; and
   causing the display to display the virtual image so that the virtual image is visually superimposed on the image of the subject or on the subject seen through a screen of the display.

2. The non-transitory storage medium according to claim 1, wherein the information processing program further causes the computer to control the information processing apparatus to perform operations comprising:
   causing the second event to occur in accordance with the deformation of the shape of the search target when a result of detection from a sensor detecting an orientation of the information processing apparatus indicates a prescribed orientation of the information processing apparatus.

3. The non-transitory storage medium according to claim 1, wherein the information processing program further causes the computer to control the information processing apparatus to perform operations comprising:
   recognizing the deformation of the shape of the search target based on an orientation of a vector extending from a center of the search target toward one side of the search target in the image of the subject.

4. The non-transitory storage medium according to claim 1, wherein
   the first event includes arrangement of an object in a prescribed shape in the virtual space, and
   the information processing program further causes the computer control the information processing apparatus to generate the virtual image by shooting the object in the prescribed shape with the virtual camera.

5. The non-transitory storage medium according to claim 4, wherein
   the first event includes arrangement of a plate-shaped polygon in the virtual space, and
   the information processing program further causes the computer to control the information processing apparatus to generate the virtual image by mapping a texture on the plate-shaped polygon and shooting the polygon with the virtual camera.

6. The non-transitory storage medium according to claim 1, wherein
   the information processing program further causes the computer to control the information processing apparatus to perform operations comprising:
   calculating positional relation between the image pick-up apparatus and the search target based on the image of the subject; and
   arranging the virtual camera in accordance with the calculated positional relation.

7. The non-transitory storage medium according to claim 1, wherein the first event includes arranging a virtual object in the virtual space and the second event includes moving the virtual object in the virtual space in accordance with the deformation of the shape of the search target.

8. The non-transitory storage medium according to claim 7, wherein the information processing program further causes the computer to determine a moving direction and a moving speed of the virtual object in the virtual space based on at least a degree of deformation of the shape of the search target.

9. An information processing apparatus connected to an image pick-up apparatus and a display, the information processing apparatus comprising at least one processor being configured to at least:
   obtain an image of a subject picked up by the image pick-up apparatus;
   detect a search target from the image of the obtained subject;
   cause a first event to occur when the search target is successfully detected;
   recognize a shape of the detected search target;
   cause a second event to occur in a virtual space in accordance with a deformation of the recognized shape of the search target, wherein the second event is caused to occur when the shape of the search target deforms to a prescribed shape subsequent to occurrence of the first event;
   generate a virtual image by shooting the second event that occurs with a virtual camera arranged in the virtual space; and
   display the virtual image such that the virtual image is visually superimposed on the image of the subject or on the subject seen through a screen of the display.

10. An information processing method processed by a controller of an information processing apparatus connected to an image pick-up apparatus and a display, the method comprising:
   obtaining an image of a subject picked up by the image pick-up apparatus;
   detecting a search target from the obtained image of the subject;
   causing a first event to occur when the search target is successfully detected;
   recognizing a shape of the detected search target;
   causing a second event to occur in a virtual space in accordance with a deformation of the recognized shape of the search target, wherein the second event is caused to occur when the shape of the search target deforms to a prescribed shape subsequent to occurrence of the first event;
   generating a virtual image by shooting the second event that occurs with a virtual camera arranged in the virtual space; and causing the display to display the virtual image such that the virtual image is visually superimposed on the image of the subject or on the subject seen through a screen of the display.

11. An information processing system, comprising:
a search target arranged in a subject;
an image pick-up apparatus configured to pick up an image of the subject;
an information processing apparatus connected to the image pick-up apparatus; and
a display connected to the information processing apparatus,
the information processing apparatus comprising at least one processor being configured at least to:
  obtain the image of the subject picked up by the image pick-up apparatus,
  detect the search target from the image of the obtained subject,
  cause a first event to occur when the search target is successfully detected;
  recognize a shape of the detected search target,
  cause a second event to occur in a virtual space in accordance with a deformation of the recognized shape of the search target, wherein the second event is caused to occur when the shape of the search target deforms to a prescribed shape subsequent to occurrence of the first event,
  generate a virtual image by shooting the second event that occurs with a virtual camera arranged in the virtual space, and
  display, on the display, the virtual image such that the virtual image is visually superimposed on the image of the subject or on the subject seen through a screen of the display.

12. An information processing system, comprising:
a camera for capturing an image of a subject having a search target;
a display; and
processing circuitry configured to at least:
  detect the search target from the image of the subject,
  cause a first event to occur when the search target is successfully detected;
  recognize a shape of the search target,
  detect a deformation of the shape of the search target and, in response thereto, generate a second event in a virtual space when the shape of the search target deforms to a prescribed shape subsequent to occurrence of the first event,
  generate a virtual image by capturing the second event using a virtual camera, and
  visually superimpose the virtual image on the image of the subject or on the subject as seen through a screen of the display.

* * * * *